(12) United States Patent
Wang et al.

(10) Patent No.: US 8,186,209 B2
(45) Date of Patent: May 29, 2012

(54) VALVE WITH RADIATING STRUCTURE FOR A TIRE PRESSURE MONITORING SYSTEM

(75) Inventors: Ruonan Wang, New Territories (HK); Chi Ho Cheng, Tseung Kwan O (HK); Yu Lou, Shatin (HK); Lydia Lap Wai Leung, Causeway Bay (HK); Ivan Man Lung Sham, Shatin (HK); Tung Ching Lui, New Territories (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 359 days.

(21) Appl. No.: 12/703,862

(22) Filed: Feb. 11, 2010

(65) Prior Publication Data

US 2011/0192221 A1 Aug. 11, 2011

(51) Int. Cl.
*B60C 23/02* (2006.01)
(52) U.S. Cl. ................................... 73/146.8; 340/442
(58) Field of Classification Search .................. None
See application file for complete search history.

(56) References Cited

U.S. PATENT DOCUMENTS

| | | | |
|---|---|---|---|
| 4,103,549 A * | 8/1978 | Schmidt ..................... 73/146.8 |
| 5,040,561 A | 8/1991 | Achterholt |
| 5,987,980 A | 11/1999 | Mangafas et al. |
| 6,011,463 A | 1/2000 | Cormier, Sr. |
| 6,101,870 A | 8/2000 | Kato et al. |
| 6,588,265 B1 * | 7/2003 | Roberson ..................... 73/146.8 |
| 6,662,642 B2 * | 12/2003 | Breed et al. ..................... 73/146 |
| 6,758,089 B2 * | 7/2004 | Breed et al. ..................... 73/146 |
| 6,799,455 B1 | 10/2004 | Neefeldt et al. |
| 6,851,308 B2 | 2/2005 | Fonteneau |
| 6,856,245 B2 * | 2/2005 | Smith et al. .................. 340/442 |
| 6,871,235 B1 * | 3/2005 | Cain ............................. 709/239 |
| 7,059,178 B2 | 6/2006 | Fischer et al. |
| 7,328,609 B1 | 2/2008 | Hopper et al. |
| 7,437,919 B1 * | 10/2008 | Wu ................................ 73/146 |
| 7,493,808 B2 * | 2/2009 | Milanovich et al. ......... 73/146.8 |
| 7,541,949 B2 | 6/2009 | Miura et al. |
| 7,549,329 B1 | 6/2009 | Yu et al. |
| 2004/0046649 A1 | 3/2004 | Sanchez et al. |
| 2004/0069057 A1 * | 4/2004 | Sapir .............................. 73/146 |
| 2006/0272402 A1 | 12/2006 | Yin et al. |
| 2008/0121031 A1 | 5/2008 | Huang |
| 2009/0007648 A1 | 1/2009 | Vickery et al. |
| 2009/0102731 A1 | 4/2009 | Jow |

* cited by examiner

*Primary Examiner* — Lisa Caputo
*Assistant Examiner* — Jermaine Jenkins
(74) *Attorney, Agent, or Firm* — Ella Cheong Hong Kong; Margaret A. Burke; Sam T. Yip

(57) ABSTRACT

A valve for a tire pressure monitoring system in which the valve acts a coaxial conductor to transmit a signal to a receiver presented. A valve stem electrically isolated from a valve pin form the coaxial conductor. In a tire pressure monitoring system, a tire pressure measurement module is positioned inside a tire. In one embodiment, a conductive radiating structure is electrically connected or coupled to the valve pin to receive the tire pressure information signal and transmit it to a receiver. The above configuration further permits a rechargeable battery in the tire pressure measurement module to be recharged via the tire valve. The valve pin and valve stem, being electrically isolated from one another, are used as recharging paths for the battery.

14 Claims, 6 Drawing Sheets

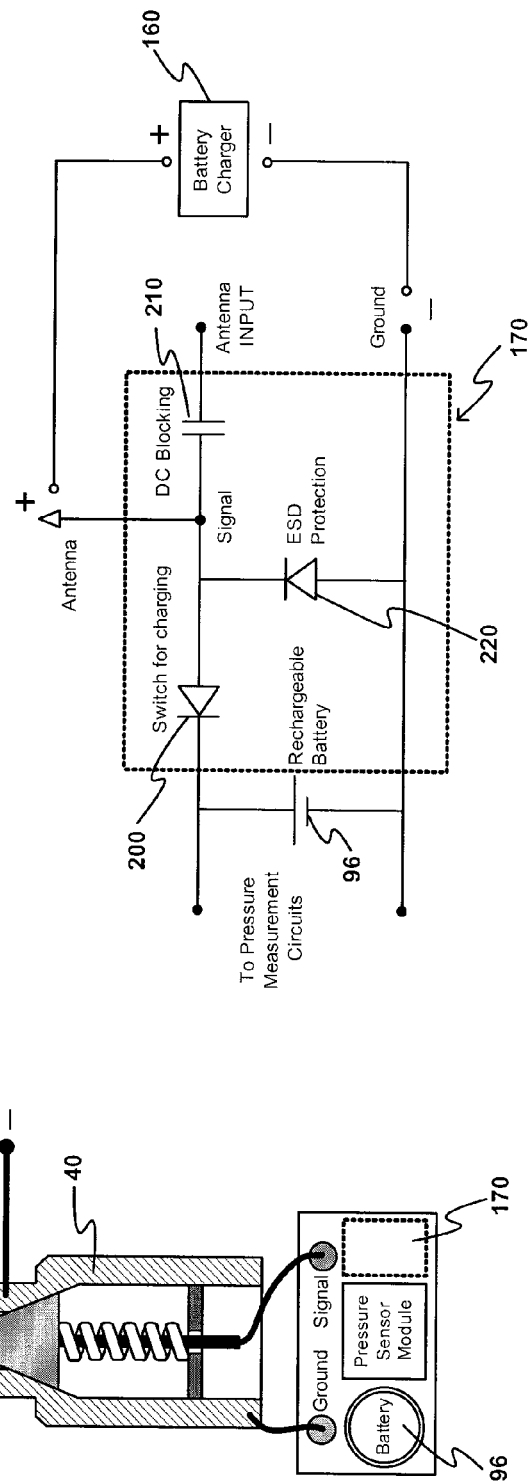

VALVE WITH RADIATING STRUCTURE FOR A TIRE PRESSURE MONITORING SYSTEM

FIELD OF THE INVENTION

The present invention relates to a valve and conductive radiating structure for a tire pressure monitoring system and, more particularly to a valve which acts as a coaxial conductor to transmit a tire pressure signal to a conductive radiating structure for transmission to a receiver.

BACKGROUND

Vehicles equipped with pneumatic tires have come under increased scrutiny as requiring more detailed information regarding tire pressure. Such tire pressure information is required for safe operation of the vehicle and for greater fuel efficiency (in the case of motor vehicles) since underinflated vehicle tires cause increased fuel consumption compared to properly inflated tires. To monitor tire pressure, various systems have been proposed. In general, tire pressure monitoring systems include a pressure monitor and an element which can transmit the tire pressure information, typically in the form of a radio frequency (r.f.) signal, to a receiver inside the vehicle. In this manner the tire pressure information can be displayed and/or alarms can be set to alert the operator of the vehicle when one or more tires has reached a critical level of underinflation or overinflation.

Several configurations have been proposed which use an antenna positioned in the tire along with a tire pressure sensor also positioned within the tire. Such systems are depicted in U.S. Patent Application Publication 2009/0007648 and U.S. Pat. No. 5,040,561. However, antennas positioned within the tire may be subject to shielding by the tire hub, resulting in diminished signal strength reaching a receiver positioned elsewhere on a vehicle.

Other configurations use one or more sections of the tire valve itself, such as the valve stem or the valve pin as an antenna or an antenna portion to transmit a signal from an internal tire pressure sensor to a receiver for display/alarm concerning the tire pressure to the operator of the vehicle. Such systems are disclosed in U.S. Pat. Nos. 6,101,870, 7,059,178, 7,328,609, 7,549,329 and U.S. Patent Publication 2008/0121031.

However, there remains a need in the art for an improved tire pressure monitoring system with improved antenna gain and improved impedance matching.

SUMMARY OF THE INVENTION

The present invention relates to a valve for a tire pressure monitoring system in which the valve acts a coaxial conductor to transmit a signal to a conductive radiating structure. The valve communicates between a tire interior and the atmosphere and includes a valve stem formed of an electrically conductive material such as metal. A valve seat is formed in the interior of the valve stem.

An electrically conductive valve pin is positioned concentrically within the valve stem and is electrically isolated from the valve stem such that the combination of the valve stem and the valve pin forms a shielded coaxial electrical transmission path.

A resilient seal which seals against the valve seat such that, when the resilient seal is seated against the valve seat, air within the tire does not escape to the atmosphere and when the resilient seal is not seated against the valve seat, air can be added to the interior of the tire or air can be permitted to escape to the atmosphere. A bias spring biases the resilient seal such that the seal is seated against the valve seat.

When used in a tire pressure monitoring system, a tire pressure measurement module is used with the valve, the tire pressure measurement module being positioned inside the tire. A first electrical connector provides electrical communication between the valve stem and a ground connection of the tire pressure measurement module positioned within a tire such that the valve stem is maintained at ground potential. A second electrical connector provides electrical communication between the valve pin and a tire pressure signal connection of the tire pressure measurement module such that the valve pin transmits a signal including tire pressure information, the signal being shielded from electromagnetic interference by the valve stem.

A conductive radiating structure is electrically connected or coupled to the valve pin to receive the tire pressure information signal from the valve pin and transmit the received signal to a receiver. In one embodiment, the radiating structure is formed by a metal patterned on a valve cap. In this manner, a signal can be transmitted substantially without loss across the rim to the radiating structure thus reducing the number of components and complexity of the valve.

The above configuration further permits a rechargeable battery in the tire pressure measurement module to be recharged via the tire valve. The valve pin or conductive radiating structure and the valve stem, being electrically isolated from one another, can be used as recharging paths for the battery.

In a further embodiment, a tire pressure monitoring system is provided including the valve and conductive radiating structure, a tire pressure measurement module, and a receiver for receiving r.f. signals from the valve to alert a vehicle operator of the tire pressure.

BRIEF DESCRIPTION OF THE DRAWINGS

FIG. 4A shows a battery charger for the system of FIG. 1 and FIG. 4B schematically depicts a battery-charging circuit for the valve of FIG. 1 and a tire pressure measurement module having a rechargeable battery.

DETAILED DESCRIPTION

Figure 1:
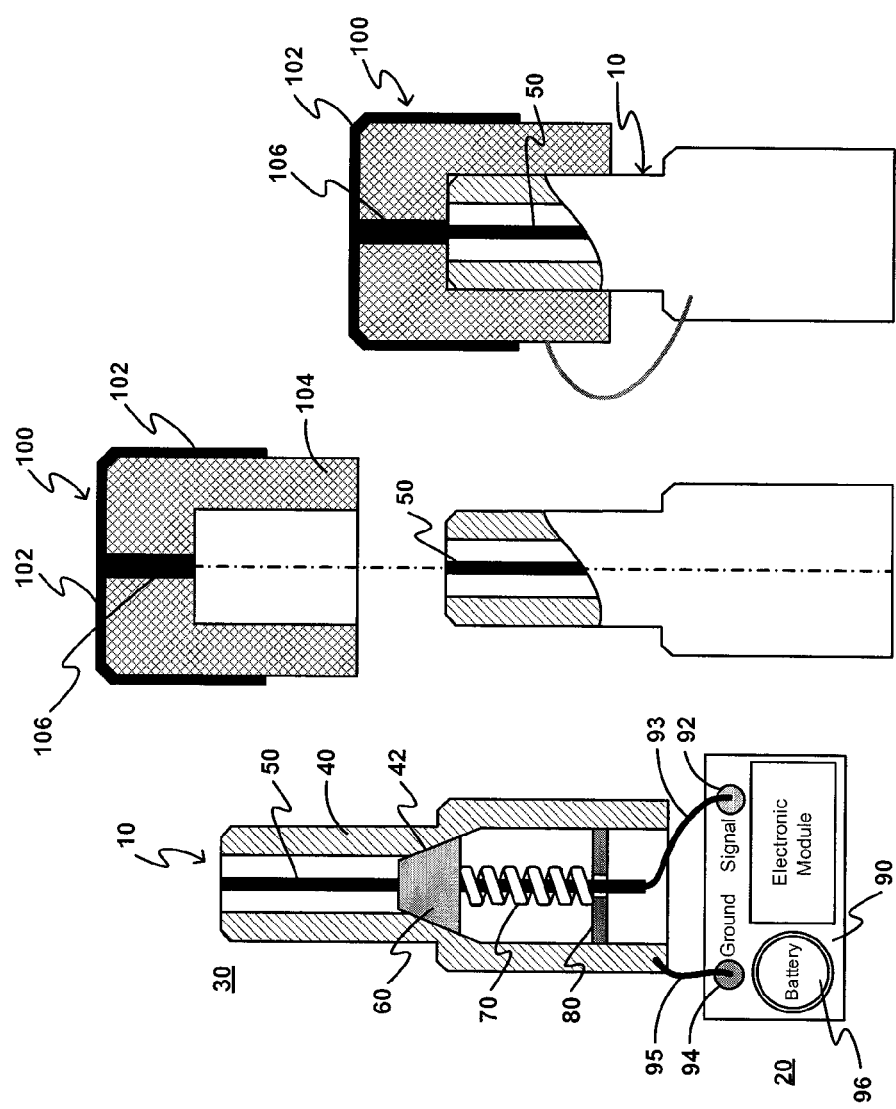
FIG. 1 is a cross-sectional view of a tire valve, and a tire valve that includes a conductive radiating structure and electrical connections to a tire pressure measurement device.

Turning to the drawings in detail in which like numerals indicate the same or similar elements in each of the several views, FIG. 1 depicts a tire valve 10 which communicates between a tire interior 20 and the atmosphere 30 and includes a valve stem 40 formed of an electrically conductive material such as metal. Suitable conductive metals include copper, copper alloys, iron alloys, aluminum; other metals and other conductive materials such as conductive particle-filled polymers or any other substantially rigid conductive material may be used for the valve stem. A valve seat 42 is formed in the interior of the valve stem.

An electrically conductive valve pin 50 is positioned concentrically within the valve stem and is electrically isolated from valve stem 40 such that the combination of the valve stem and the valve pin forms a shielded coaxial electrical transmission path. In other words, valve stem 40 acts as the shielding layer of a coaxial conductor (which will be connected to ground as discussed below) while air constitutes the dielectric of the coaxial conductor. Valve pin 50 acts as the metal core of the coaxial conductor for transmitting a radio frequency signal in a substantially lossless manner. Electrically conductive materials include metals such as copper, iron alloys, aluminum or any other metal, metal alloy, or other conductive material capable of transmitting a signal and having sufficient strength to withstand the forces applied to a valve pin when air is added to a tire.

A resilient material 60 is provided which seals against the valve seat such that, when the resilient seal is seated against valve seat 42, air within the tire 20 does not escape to the atmosphere 30 and when the resilient seal is not seated against the valve seat, air can be added to the interior of the tire or air can be permitted to escape to the atmosphere. Elastomers such as rubbers, including silicone rubber and styrene-butadiene rubber, can be used as the resilient seal 60; however any resilient material which can form a seal with the valve seat may be used in the valves of the present invention. Note that the resilient seal also assists in electrically isolating valve pin 50 from valve 40 since it is made from an electrically insulating material.

A bias spring 70 biases the resilient seal such that the seal is seated against the valve seat. Thus valve 10 is normally in a closed position and is opened by application of force to valve pin 50 to compress bias spring 70 and permit air to flow in or out of a tire. One end of the spring is positioned against resilient seal 60 and the other end is positioned against a plate 80 which acts as a spring stop. Plate 80 is made from an insulating material such as a polymeric material to further electrically isolate pin 50 from valve 40. Note that this configuration is merely exemplary and that any other system for biasing the seal against the valve seat is contemplated for use in the present invention.

When used in a tire pressure monitoring system, a tire pressure measurement module 90 is used with the valve, the tire pressure measurement module 90 being positioned inside the tire. The tire pressure measurement module senses the pressure inside the tire and converts it into an electrical signal indicative of the tire pressure. Such tire pressure measurement modules are well-known in the art and commercially available and will not be described in further detail here. Any tire pressure measurement device configured for use inside a tire may be used in the tire pressure measurement module 90 provided that the device includes a signal connection 92 and a ground connection 94. In an exemplary embodiment, the module 90 includes a rechargeable battery 96 which is included inside the module; however, it is also possible to position the rechargeable battery 96 outside the module. A first electrical connector 95 provides electrical communication between the valve stem and the ground connection 94 of the tire pressure measurement module such that the valve stem is maintained at ground potential. A second electrical connector 93 provides electrical communication between the valve pin 50 and a tire pressure signal connection 92 of the tire pressure measurement module such that the valve pin transmits a signal including tire pressure information, the signal being shielded from electromagnetic interference by the valve stem 40.

Although the coaxial conductor formed by the valve 10 of FIG. 1 is sufficient to transmit an r.f. signal to a receiver without additional elements, to enhance the radiation area of the valve an additional conductive radiating structure is provided. In an exemplary embodiment, this conductive radiating structure is an electrically conductive component, such as a metal component, formed into a variety of configurations which enhance radiation of the signal transmitting through the coaxial conductor of valve 10. A particularly convenient technique for ensuring that the conductive radiating structure electrically communicates with the coaxial conductor is to mount the conductive radiating structure on a valve cap which mechanically engages valve 10. However, it is understood that the conductive radiating structure can be independent of any supporting structure such as a valve cap and may electrically connect or couple to valve 10 in any number of conventional mechanical fastening techniques (e.g., threaded attachment, friction fit, bonding, welding, etc.).

An antenna valve cap 100 electrically communicates with valve pin 50 to receive the tire pressure information signal from the valve pin and transmit the received signal to a receiver (shown in FIG. 5) through a conductive radiating structure 102 patterned on the valve cap. In this manner, a signal is transmitted substantially without loss via the valve pin to the conductive radiating structure 102 formed on the valve cap. The valve cap is formed from an electrically insulating material 104, such as a polymeric material, with the conductive radiating structure 102 patterned thereon. In this manner, the cap is positioned on the exterior of the valve stem 40 without making electrical connection therewith. That is, the valve cap with conductive radiating structure 102 is electrically isolated from the valve stem 40. The valve cap may be threaded for engagement with valve stem 40 (not shown) or may be snap fit or friction fit to the valve stem, with or without additional affixing elements such as biasing members (for example, a spring). Any technique for ensuring that the valve cap is removably affixed to the valve stem may be used in the present invention.

In one embodiment, an electrically conductive valve pin connector 106 is positioned through the valve cap 100 thus electrically connecting the valve pin 50 to the conductive radiating structure 102 on the exterior of the valve cap.

FIG. 2 depicts a number of radiating structures that may be used with valve 10 to enhance transmission of the r.f. signal. These may be used with or without a valve cap, as discussed above. As best seen in FIG. 2A, in one embodiment, the conductive radiating structure 102A has an umbrella-like metal pattern (that is, the metal hub and spokes of an umbrella). In a further embodiment, a conductive radiating structure 102B (FIG. 2B) is configured as a spiral which includes electrically conductive pin connector 106 for electrical communication with valve pin 50.

Figure 2C:
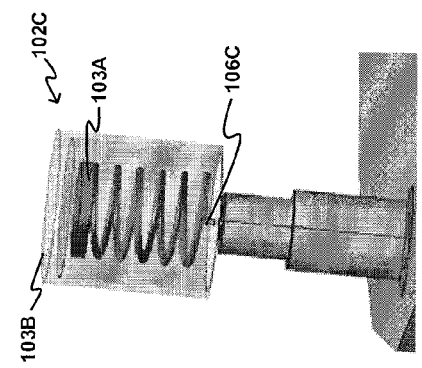
FIGS. 2A-2F show conductive radiating structure configurations.
Figure 2A:
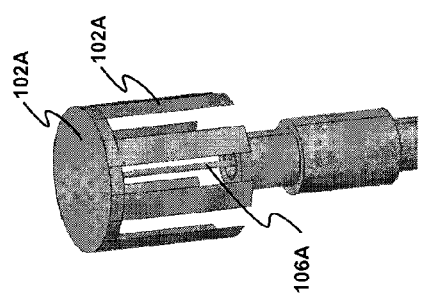

As seen in FIG. 2C, a coil forms a conductive radiating structure 102C and a capacitor is also provided to form a capacitive feeding antenna. In this structure, the two plates of a capacitor are formed from the top of the coil 103A and from the metal surface on the top of the valve cap 103B.

Figure 2B:
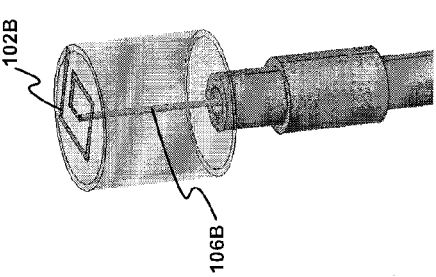
Figure 3B:
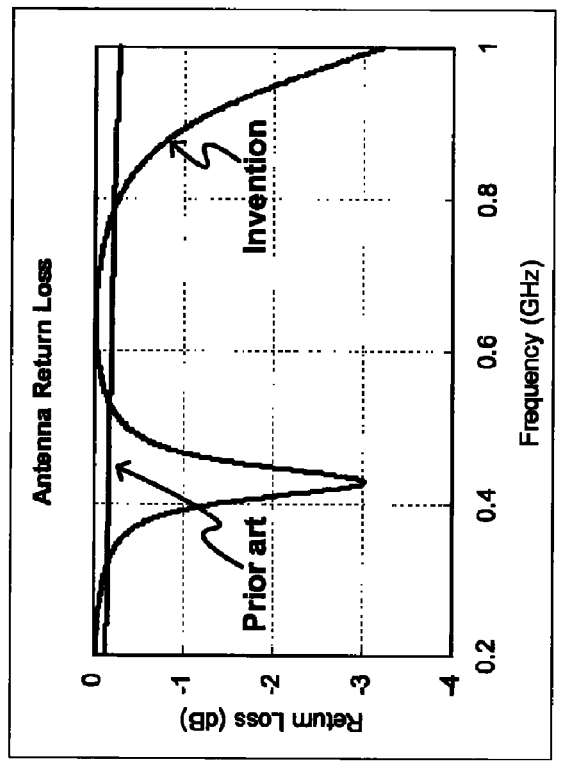
FIGS. 3A and 3B depict improved impedance matching for two of the conductive radiating structure configurations of FIG. 2.
Figure 3A:
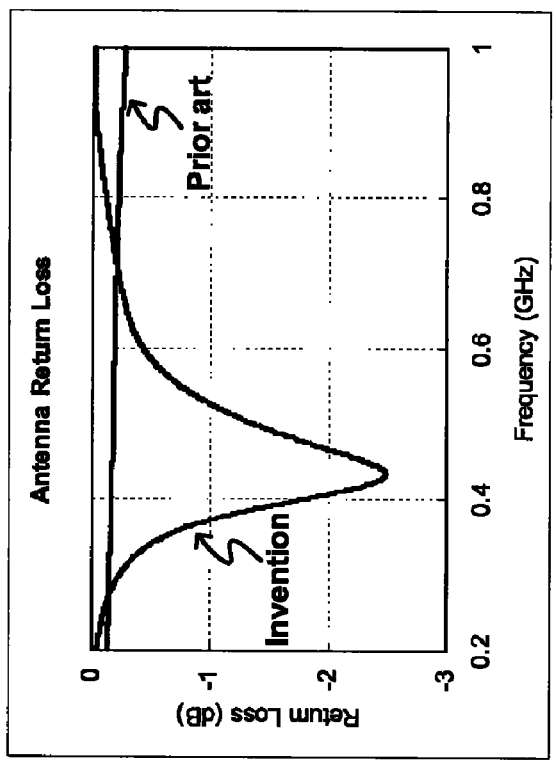

FIG. 3A depicts return loss as a function of frequency for the conductive radiating structure configuration of FIG. 2B; similarly, FIG. 3B depicts a return loss plot for the conductive radiating structure of FIG. 2C. Both configurations show impedance matching at 434 MHz, a substantial improvement over prior art antennas whose return loss is shown for comparison purposes. (Note that 434 MHz is designated by government regulation as the frequency for tire pressure monitoring systems in the world, thus impedance matching at this frequency is desirable.)

Figure 2E:
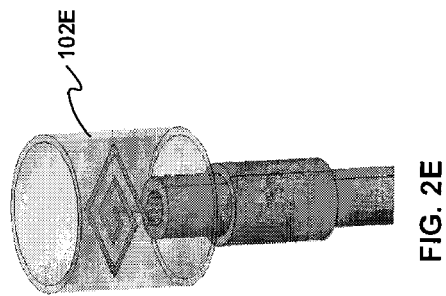
Figure 2F:
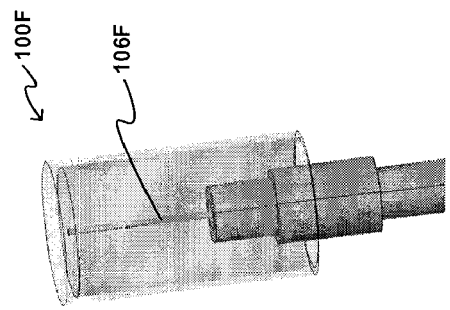
Figure 2D:
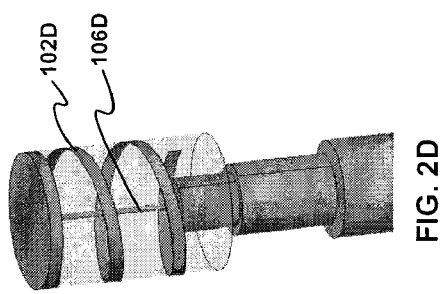

In FIG. 2D, a spiral metal conductive radiating structure 102D is formed, while FIG. 2E depicts a spiral radiating structure substantially similar to FIG. 2B but positioned approximately midway through the valve cap 100. Particular positions may be selected based on overall system configurations to optimize impedance matching. FIG. 2F shows that various valve cap sizes 100F can be produced to optimize impedance matching when the conductive radiating structure is selected to be positioned on a valve cap. It is noted that the conductive radiating structure configurations of FIG. 2 are merely exemplary; any conductive radiating structure that electrically communicates with valve 10 to enhance r.f. transmission is contemplated for use in the present invention. Selection is based on various factors such as better input impedance and higher antenna gain.

FIG. 4A shows a battery charging system for rechargeable battery 96 as used in a tire pressure monitoring system according to the present invention. FIG. 4B is a schematic diagram of the system of FIG. 4A. A battery charger 160 has positive and negative connectors; the positive connector is connected to either the conductive radiating structure 102 (as depicted) or, alternatively, directly to the valve pin 50 (not shown) and the negative connector to valve stem 40. A charging circuit 170 is provided in the module positioned within the tire. Charging circuit 170 includes switching diode 200, d.c. blocking capacitor 210, and electrostatic discharge protection diode 220.

During charging, switching diode 200 is opened due to the higher voltage of battery charger 160 and the battery 96 is charged. In this manner, the rechargeable battery 96 can be recharged without the need to remove the pressure measurement module 90 from the tire and without the need to replace the battery.

Figure 5:
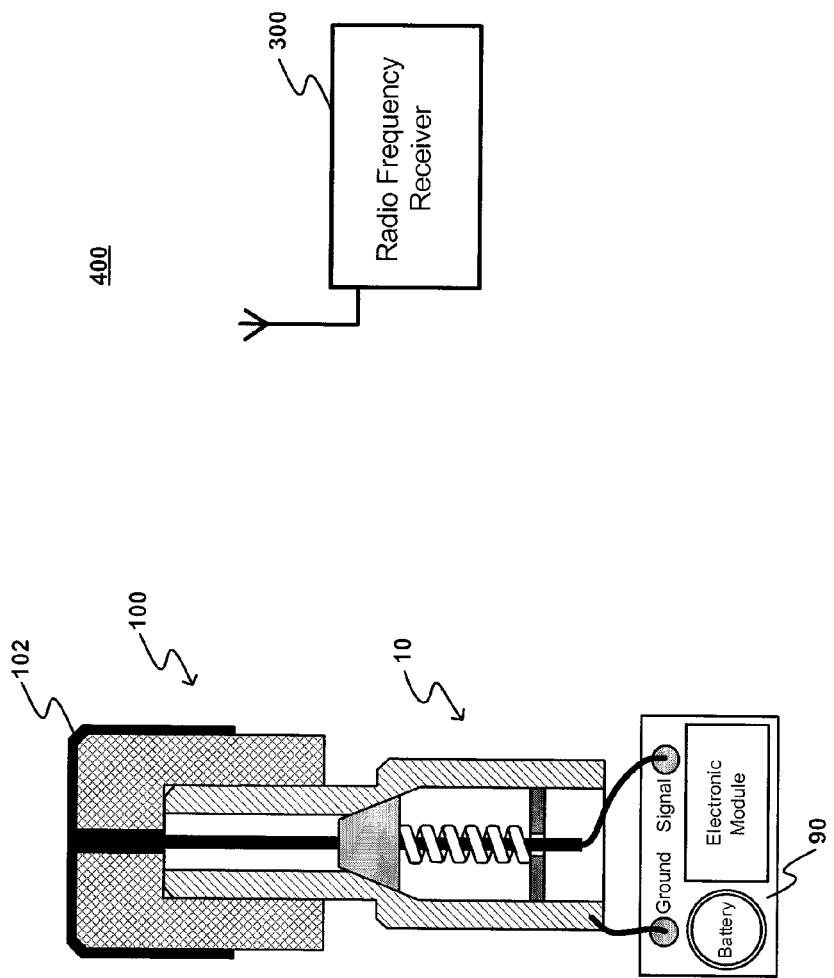
FIG. 5 schematically represents a tire pressure monitoring system based on the tire valve of FIG. 1.

The tire valve and conductive radiating structure of the present invention find use in a tire pressure measurement system 400 which includes a radio frequency receiver 300 to receive the signal emitted from the conductive radiating structure, as shown in FIG. 5. When used in connection with a motor vehicle, typically one tire valve/radiating structure (10/100) plus pressure measurement module 90 is used per tire. The radio frequency receiver is positioned in the vehicle and can inform the operator of the vehicle of the tire inflation levels and/or provide alarms to indicate when the pressure is too low or too high.

While the foregoing invention has been described with respect to various embodiments, it is understood that other embodiments are within the scope of the present invention as expressed in the following claims and their equivalents. For example, an r.f. receiver could be positioned elsewhere than in a vehicle such as at a vehicle checkpoint to determine if the vehicle is being operated safely. Further, the system of the present invention is not limited to motor vehicles but finds application in any apparatus having pneumatic tires where the pressure of a tire is important. This includes construction equipment, factory machines, bicycles, etc.

What is claimed is:

1. In a tire pressure monitoring system the improvement comprising:
   a valve communicating between a tire interior and the atmosphere, the valve comprising:
      a valve stem formed of an electrically conductive material and including a valve seat formed in the interior of the valve stem;
      a valve pin positioned concentrically within the valve stem and formed of an electrically conductive material, the valve pin being positioned such that it is electrically isolated from the valve stem, the combination of the valve stem and the valve pin forming a shielded coaxial electrical transmission path;
      a resilient seal which seals against the valve seat such that, when the resilient seal is seated against the valve seat, air within the tire does not escape to the atmosphere and when the resilient seal is not seated against the valve seat, air can be added to the interior of the tire or air can be permitted to escape to the atmosphere;
      a bias spring which biases the resilient seal such that the seal is seated against the valve seat;
      a first electrical connector which provides electrical communication between the valve stem and a ground connection of a tire pressure measurement module positioned within a tire such that the valve stem is maintained at ground potential;
      a second electrical connector which provides electrical communication between the valve pin and a tire pressure signal connection of the tire pressure measurement module such that the valve pin transmits a signal including tire pressure information, the signal being shielded from electromagnetic interference by the valve stem;
      a conductive radiating structure electrically connected or coupled to the valve pin to receive the tire pressure information signal from the valve pin and transmitting the received signal to a receiver.

2. The tire pressure monitoring system of claim 1 wherein the conductive radiating structure is patterned on a valve cap and the valve cap includes a cap end and cap sidewall and the cap sidewall is formed from a substantially electrically insulating material and the conductive radiating structure includes a metal pattern at least partially formed on the electrically insulating material.

3. The tire pressure monitoring system of claim 2 wherein the metal pattern includes a spiral which extends along external sidewalls of the valve cap.

4. The tire pressure monitoring system of claim 2 wherein the metal pattern includes linear conductors extending along external sidewalls of the valve cap and connect to a conductor formed on an end of the valve cap.

5. The tire pressure monitoring system of claim 2 wherein the metal pattern includes a spiral formed on an end of the valve cap.

6. The tire pressure monitoring system of claim 1 wherein the tire pressure measurement module includes a rechargeable battery and charging circuit, the charging circuit including a switching diode.

7. A method comprising:
   providing the tire pressure monitoring system of claim 6;
   providing an electrical battery charger having connectors for connecting to the valve stem and to the valve pin or the conductive radiating structure;
   providing an electrical current to the valve pin having a voltage sufficient to open the switching diode such that the rechargeable battery is charged via the valve pin and the valve stem.

8. The tire pressure measuring system of claim 1 wherein the tire pressure measurement module includes a rechargeable battery electrically connected to the valve and further comprising an r.f. receiver for receiving r.f. signals from the conductive radiating structure.

9. A valve for a tire pressure monitoring system comprising:
   a valve stem formed of an electrically conductive material and including a valve seat formed in the interior of the valve stem;
   a valve pin positioned concentrically within the valve stem and formed of an electrically conductive material, the valve pin being positioned such that it is electrically isolated from the valve stem, the combination of the valve stem and the valve pin forming a shielded coaxial electrical transmission path such that when the valve pin transmits a signal including tire pressure information, the signal is shielded from electromagnetic interference by the valve stem;

a resilient seal which seals against the valve seat such that, when the resilient seal is seated against the valve seat, air within the tire does not escape to the atmosphere and when the resilient seal is not seated against the valve seat, air can be added to the interior of the tire or air can be permitted to escape to the atmosphere;

a conductive radiating structure electrically connected or coupled to the valve pin to receive the tire pressure information signal from the valve pin and transmit the received signal to a receiver.

10. The valve of claim 9 further comprising a valve cap including a cap end and cap sidewall and the cap sidewall is formed from a substantially electrically insulating material and the conductive radiating structure includes a metal pattern at least partially formed on the electrically insulating material.

11. The valve of claim 10 including a conductor on the cap end which forms a plate of a capacitor with a second plate of the capacitor formed within the valve cap, the capacitor electrically communicating with a conductive radiating structure within the valve cap.

12. The valve of claim 9 wherein the conductive radiating structure is formed as a spiral.

13. The valve of claim 9 wherein the conductive radiating structure includes linear conductors.

14. The valve of claim 9 further comprising a tire pressure measurement module including a rechargeable battery and charging circuit in electrical communication with the valve.

* * * * *